(12) United States Patent
Oyasato

(10) Patent No.: US 8,917,413 B2
(45) Date of Patent: Dec. 23, 2014

(54) IMAGE FORMING SYSTEM CAPABLE OF SWITCHING AMONG A PLURALITY OF POWER STATES

(71) Applicant: KYOCERA Document Solutions Inc., Osaka (JP)

(72) Inventor: Tomoki Oyasato, Osaka (JP)

(73) Assignee: KYOCERA Document Solutions Inc. (JP)

( * ) Notice: Subject to any disclaimer, the term of this patent is extended or adjusted under 35 U.S.C. 154(b) by 108 days.

(21) Appl. No.: 13/778,797

(22) Filed: Feb. 27, 2013

(65) Prior Publication Data

US 2013/0222848 A1 Aug. 29, 2013

(30) Foreign Application Priority Data

Feb. 29, 2012 (JP) ................................ 2012-043115

(51) Int. Cl.
| | | |
|---|---|---|
| *G06F 3/12* | (2006.01) | |
| *H04N 1/00* | (2006.01) | |
| *G03G 15/00* | (2006.01) | |

(52) U.S. Cl.
CPC ....... *H04N 1/00896* (2013.01); *G03G 15/5004* (2013.01); *G03G 15/5087* (2013.01)
USPC ......... 358/1.15; 358/1.1; 358/1.13; 358/1.14; 358/1.16; 358/1.18

(58) Field of Classification Search
None
See application file for complete search history.

(56) References Cited

U.S. PATENT DOCUMENTS

| | | | | |
|---|---|---|---|---|
| 2003/0174359 | A1* | 9/2003 | Gomi | 358/1.15 |
| 2010/0067043 | A1* | 3/2010 | Sasaki | 358/1.15 |
| 2010/0149581 | A1* | 6/2010 | Shinto | 358/1.14 |

FOREIGN PATENT DOCUMENTS

| | | |
|---|---|---|
| JP | 2002-297337 | 10/2002 |
| JP | 2004-334793 | 11/2004 |
| JP | 2005-173689 | 6/2005 |
| JP | 2010-205129 | 9/2010 |

* cited by examiner

*Primary Examiner* — Miya J Cato
(74) *Attorney, Agent, or Firm* — McDonnell Boehnen Hulbert & Berghoff LLP

(57) ABSTRACT

An image forming apparatus includes a power-state switching unit, a proxy-process executing unit, a proxy-generation-information transmission unit, and a printing-process take-over unit. The power-state switching unit switches among a plurality of power states including an ordinary state and a power-saving state. The proxy-process executing unit executes a proxy process, which is a proxy process to halfway through a printing process, to be executed by an external target unit. The proxy-generation-information transmission unit transmits proxy generation information to the target unit when the power of the target unit is in the ordinary state. The printing-process take-over unit takes over printing from halfway based on the received proxy generation information.

12 Claims, 14 Drawing Sheets

IMAGE FORMING SYSTEM CAPABLE OF SWITCHING AMONG A PLURALITY OF POWER STATES

REFERENCE TO RELATED APPLICATIONS

This application is based upon, and claims the benefit of priority from, corresponding Japanese Patent Application No. 2012-043115 filed in the Japan Patent Office on Feb. 29, 2012, the entire contents of which are incorporated herein by reference.

FIELD

The present disclosure relates to an image forming apparatus, an image forming system, and a non-transitory computer-readable recording medium in which it is possible to switch among a plurality of power states including an ordinary state and a power-saving state in which power consumption is lower than that in the ordinary state.

BACKGROUND

A typical image forming system is known in which a server executes a response process to be executed by an image forming apparatus by proxy when the image forming apparatus is in a power-saving state.

Another typical image forming system is known in which, when a first image forming apparatus shifts to a power-saving state, a file that the first image forming apparatus stores is transferred to a second image forming apparatus. When a request to acquire the file that the first image forming apparatus stores is issued from a third image forming apparatus when the first image forming apparatus is in the power-saving state, the second image forming apparatus transmits the file that the second image forming apparatus stores to the third image forming apparatus. The second image forming apparatus transmits the file by proxy until the first image forming apparatus returns from the power-saving state to an ordinary state.

SUMMARY

An image forming apparatus according to an aspect of the present disclosure includes a power-state switching unit, a proxy-process executing unit, a proxy-generation-information transmission unit, and a printing-process take-over unit. The power-state switching unit switches among a plurality of power states including an ordinary state and a power-saving state in which power consumption is lower than that in the ordinary state. The proxy-process executing unit executes a proxy process upon request, the proxy process being a proxy process to halfway through a printing process to be executed by an external target unit. The external target unit is a target image forming apparatus that an external information processing unit requests to execute printing. The proxy-generation-information transmission unit transmits proxy generation information to the target unit. The proxy generation information is information generated by the proxy process executed by the proxy-process executing unit. The proxy-generation-information transmission unit transmits the proxy generation information to the target unit when the power of the target unit is in the ordinary state. The printing-process take-over unit takes over the printing from halfway based on the received proxy generation information.

An image forming system according to an aspect of the present disclosure includes a plurality of image forming apparatuses and an information processing unit that requests the plurality of image forming apparatuses to execute printing. The information processing unit includes a proxy-unit search unit and a proxy-process request unit. The proxy-unit search unit searches for a proxy unit serving as the image forming apparatus that executes a proxy process that is a proxy process to halfway through a printing process. The proxy process is to be executed by a target unit that is the image forming apparatus requested to execute printing. The proxy-process request unit requests the proxy unit found by the proxy-unit search unit to execute the proxy process. The proxy-unit search unit searches for the proxy unit when the power of the target unit is in a predetermined power-saving state. Each of the plurality of image forming apparatuses includes a power-state switching unit that switches among a plurality of power states including an ordinary state and a power-saving state in which power consumption is lower than that in the ordinary state. The proxy unit includes a proxy-process executing unit and a proxy-generation-information transmission unit. The proxy-process executing unit executes the proxy process upon request. The proxy-generation-information transmission unit transmits proxy generation information to the target unit. The proxy generation information is information generated by the proxy process executed by the proxy-process executing unit. The proxy-generation-information transmission unit transmits the proxy generation information to the target unit when the power of the target unit is in the ordinary state. The target unit includes a printing-process take-over unit that, when receiving the proxy generation information, takes over the printing from halfway based on the proxy generation information.

A non-transitory computer-readable recording medium that stores a program for an information processing unit according to an aspect of the present disclosure stores a program for an information processing unit. The program is executed by an information processing unit that requests a plurality of image forming apparatuses to switch among a plurality of power states including an ordinary state and a power-saving state in which power consumption is lower than that in the ordinary state to execute printing. The program for the information processing unit causes the information processing unit to function as a proxy-unit search unit and a proxy-process request unit. The proxy-unit search unit searches for a proxy unit serving as the image forming apparatus that executes a proxy process. The proxy process is a proxy process to halfway through a printing process and is to be executed by a target unit that is the image forming apparatus requested to execute printing. The proxy-unit search unit searches the proxy unit when the power of the target unit is in the predetermined power-saving state. The proxy-process request unit requests the proxy unit found by the proxy-unit search unit to execute the proxy process.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Example apparatus and method are described herein. Other example embodiments or features may further be utilized, and other changes may be made, without departing from the spirit or scope of the subject matter presented herein. In the following detailed description, reference is made to the accompanying drawings, which form a part thereof.

An embodiment of the present disclosure will be described with reference to the drawings.

First, the configuration of a network system serving as an image forming system according to this embodiment will be described.

Figure 1:
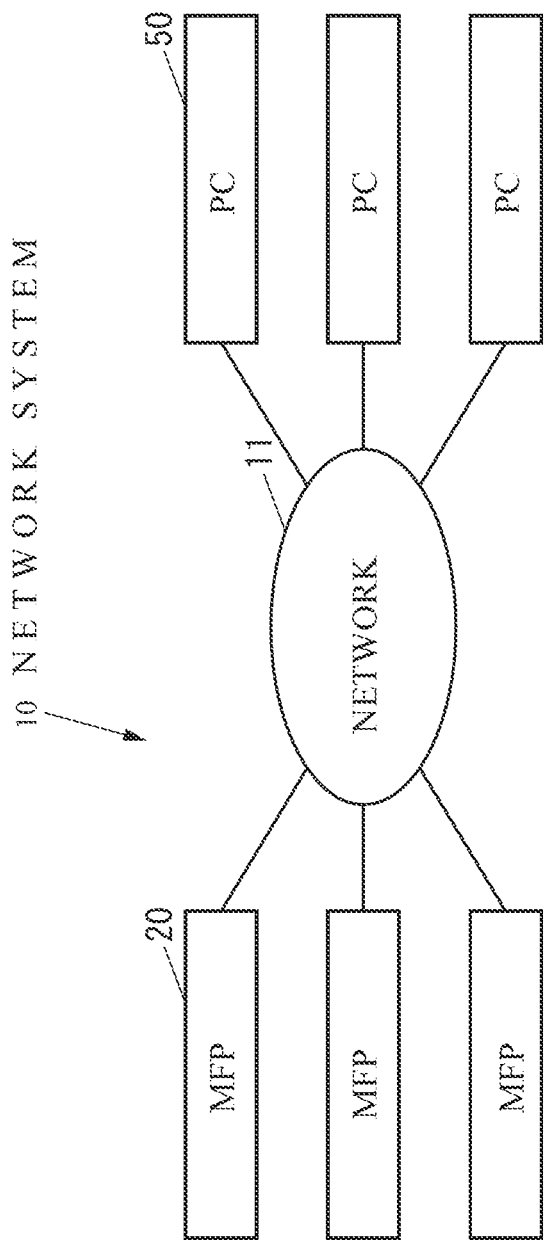
FIG. 1 shows a block diagram illustrating a configuration of a network system according to an embodiment of the present disclosure.

FIG. 1 shows a block diagram illustrating a configuration of a network system 10 according to this embodiment.

As shown in FIG. 1, the network system 10 includes a plurality of multifunction peripherals ("MFPs") serving as image forming apparatuses and a plurality of personal computers ("PCs") serving as information processing units that request the MFPs to execute printing. The plurality of MFPs and the plurality of PCs are connected in order to communicate with each other via a network 11, such as a local area network ("LAN") and the Internet. The plurality of MFPs includes a MFP 20. The individual constituents of the plurality of MFPs are the same as the constituents of the MFP 20. The plurality of PCs includes a PC 50. The individual constituents of the plurality of PCs are the same as the constituents of the PC 50.

The power state of the MFPs can be switched among an ordinary state, a low-power-saving state, which is one of power-saving states in which power consumption is lower than that in the ordinary state, and a high-power-saving state. The high-power-saving state is one of power-saving states in which power consumption is lower than the ordinary state and in which power-saving performance is higher than that in the low-power-saving state. The time necessary for the MFPs to return from the high-power-saving state to the ordinary state is longer than the time necessary for the MFPs to return from the low-power-saving state to the ordinary state.

Figure 2:
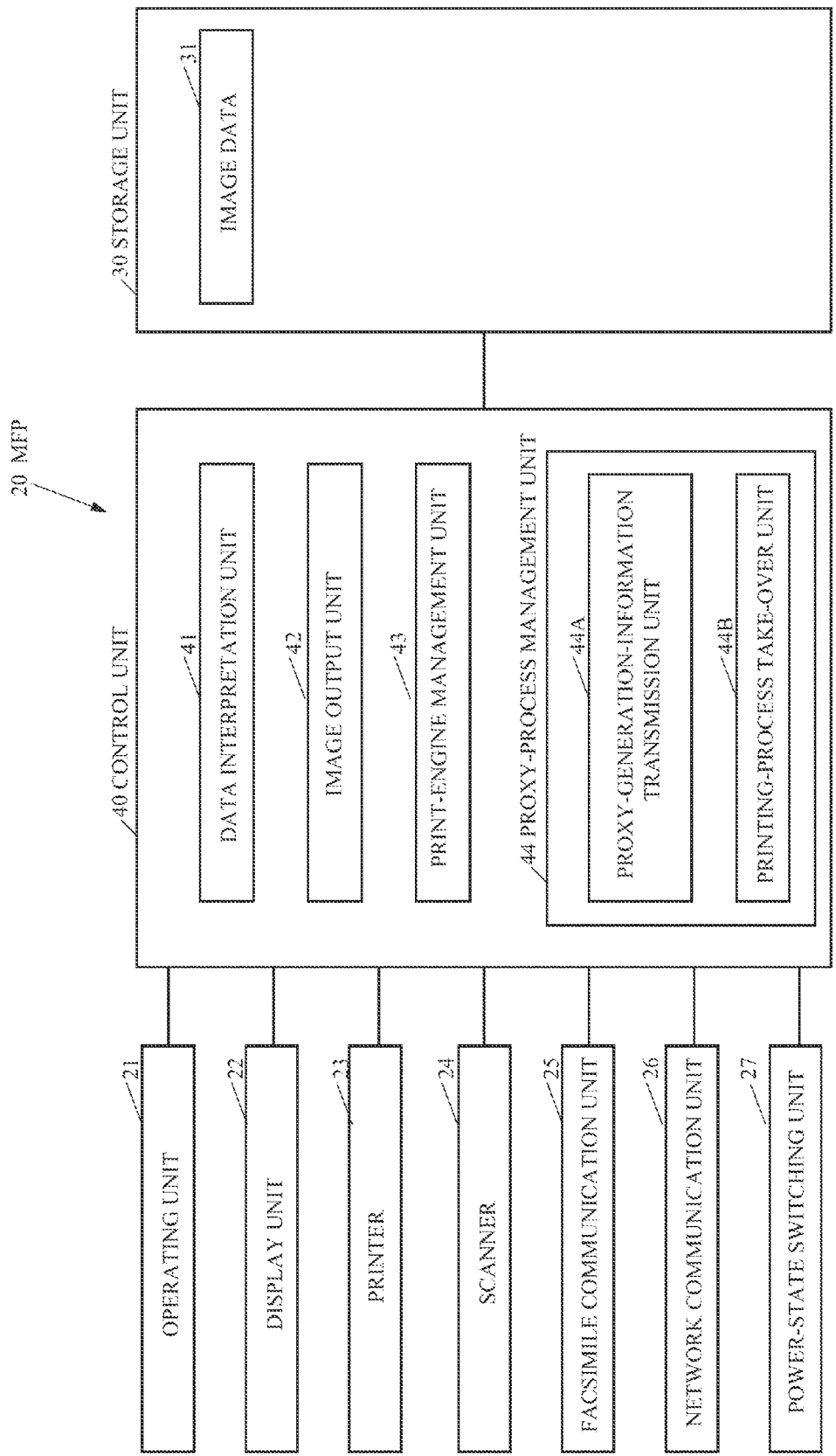
FIG. 2 shows a block diagram illustrating a configuration of a multifunction peripheral ("MFP") of the network system.

FIG. 2 shows a block diagram illustrating a configuration of the MFP 20.

As shown in FIG. 2, the MFP 20 includes an operating unit 21, a display unit 22, a printer 23, a scanner 24, a facsimile communication unit 25, a network communication unit 26, a power-state switching unit 27, a storage unit 30, and a control unit 40. The operating unit 21 is an input device, such as a button, to which various user operations are input. The display unit 22 is a display device, such as a liquid crystal display ("LCD"), on which various items of information are displayed. The printer 23 is a printing device that executes image printing on a recording medium, such as paper. The scanner 24 is a reading device that reads an image from a document. The facsimile communication unit 25 is a facsimile device that performs facsimile communications via a communication line, such as a public telephone line. The network communication unit 26 is a network communication device that performs communications via the network 11. The power-state switching unit 27 is a device that switches the power state of the MFP 20. The storage unit 30 is a storage device, such as an electrically erasable programmable read-only memory ("EEPROM") and a hard disk drive ("HDD"), that stores various data, such as programs. The control unit 40 controls the entire MFP 20.

The storage unit 30 can store image data 31 immediately before being printed.

The control unit 40 includes, for example, a central processing unit ("CPU"), a read only memory ("ROM") that stores programs and various data in advance, and a random access memory ("RAM") used as a work area for the CPU. The CPU executes programs stored in the ROM or the storage unit 30.

The control unit 40 functions as a data interpretation unit ("interpreter") 41, an image output unit ("VIDEO") 42, a print-engine management unit 43, and a proxy-process management unit 44 by executing programs stored in the storage unit 30. The data interpretation unit 41 interprets received data. The image output unit 42 generates the image data 31 immediately before being printed. The print-engine management unit 43 manages the printer 23. The proxy-process management unit 44 manages a proxy process, which is a proxy process to halfway through a printing process to be executed by an external target unit. The external target unit is a target MFP that the PC requests to execute printing. The data interpretation unit 41 and the image output unit 42 are configured to execute a proxy process when requested to execute the proxy process and constitute a proxy-process executing unit of the present disclosure.

The proxy-process management unit 44 includes a proxy-generation-information transmission unit 44a and a printing-process take-over unit 44b. The proxy-generation-information transmission unit 44a transmits proxy generation information, which is information generated by a proxy process executed by the data interpretation unit 41 and the image output unit 42, to the target unit. The printing-process take-over unit 44b takes over printing from halfway therethrough and executes it based on the received proxy generation information.

When the power of the MFP 20 is in the ordinary state, the control unit 40 controls the power-state switching unit 27 so that it supplies power to all the components of the MFP 20, including the printer 23. When the power of the MFP 20 shifts from the ordinary state to the low-power-saving state, the control unit 40 controls the power-state switching unit 27 so that it stops supplying power to the printer 23. When the power of the MFP 20 shifts from the low-power-saving state to the high-power-saving state, the control unit 40 controls the power-state switching unit 27 so that it not only stops supplying power to the printer 23, but also stops supplying power to more components of the MFP 20 as compared to the low-power-saving state. When a predetermined condition is satisfied, the control unit 40 causes the power-state switching unit 27 to shift the power of the MFP 20 to the low-power-saving state. An example of such a predetermined condition is when the period during which no operation is input to the operating unit 21 in the ordinary state reaches a predetermined period or more. Furthermore, when a predetermined condition is satisfied, the control unit 40 causes the power-state switching unit 27 to shift the power of the MFP 20 to the high-power-saving state. An example of such a predetermined condition is when the period during which no operation is input to the operating unit 21 in the low-power-saving state reaches a predetermined period or more, The individual constituents of the plurality of MFPs are the same as the constituents of the MFP 20. Accordingly, the individual constituents of the plurality of MFPs are also described using the same reference numerals as those of the MFP 20.

Figure 3:
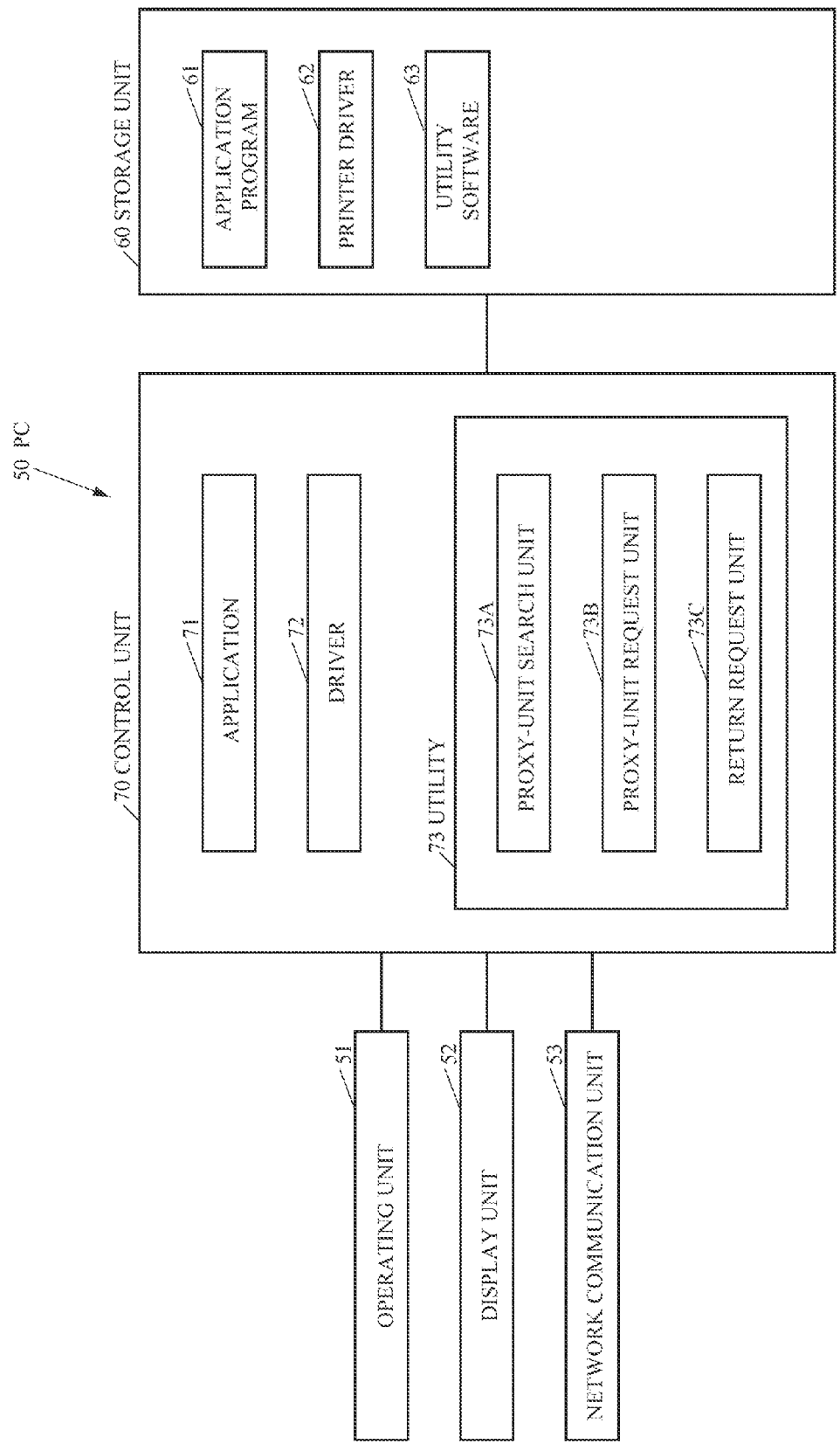
FIG. 3 shows a block diagram illustrating a configuration of a personal computer ("PC") of the network system.

FIG. 3 shows a block diagram illustrating a configuration of the PC 50.

As shown in FIG. 3, the PC 50 includes an operating unit 51, a display unit 52, a network communication unit 53, a storage unit 60, and a control unit 70. The operating unit 51 is an input device, such as a mouse and a keyboard, to which various user operations are input. The display unit 52 is a display device, such as an LCD, on which various items of information are displayed. The network communication unit 53 is a network communication device that performs communications via the network 11. The storage unit 60 is a storage device, such as a HDD, that stores various data, such as programs. The control unit 70 controls the entire PC 50.

The storage unit 60 stores various application programs 61, a printer driver 62 for controlling the MFPs, and utility software 63 serving as a program for the information processing unit of the present disclosure.

The application programs 61, the printer driver 62, and the utility software 63 may be installed in the PC 50 at the stage of manufacturing the PC 50, be additionally installed from a storage medium, such as a universal serial bus ("USB") memory, a compact disc ("CD"), and a digital versatile disc ("DVD"), to the PC 50, or be additionally installed to the PC 50 via the network 11.

The control unit 70 includes, for example, a CPU, a ROM that stores programs and various data in advance, and a RAM used as a work area for the CPU. The CPU executes programs stored in the ROM or the storage unit 60.

The control unit 70 functions as an application 71, a driver 72, and a utility 73 by executing the application programs 61, the printer driver 62, and the utility software 63, respectively.

The utility 73 includes a proxy-unit search unit 73a, a proxy-process request unit 73b, and a return request unit 73c. The proxy-unit search unit 73a searches for a proxy unit serving as an MFP that executes a proxy process, which is a proxy process to halfway through a printing process to be executed by a target unit. The target unit is a target MFP that is requested to execute printing. The proxy-process request unit 73b requests the proxy unit found by the proxy-unit search unit 73a to execute the proxy process. When the power of the target unit is in the power-saving state, the return request unit 73c requests the target unit to return to the ordinary state.

The individual constituents of the plurality of PCs are the same as the constituents of the PC 50. Accordingly, the individual constituents of the plurality of PCs are also described using the same reference numerals as those of the PC 50.

Next, the operation of the network system 10 will be described.

First, the operation of the PC when requesting the MFP to execute printing will be described.

Figure 4:
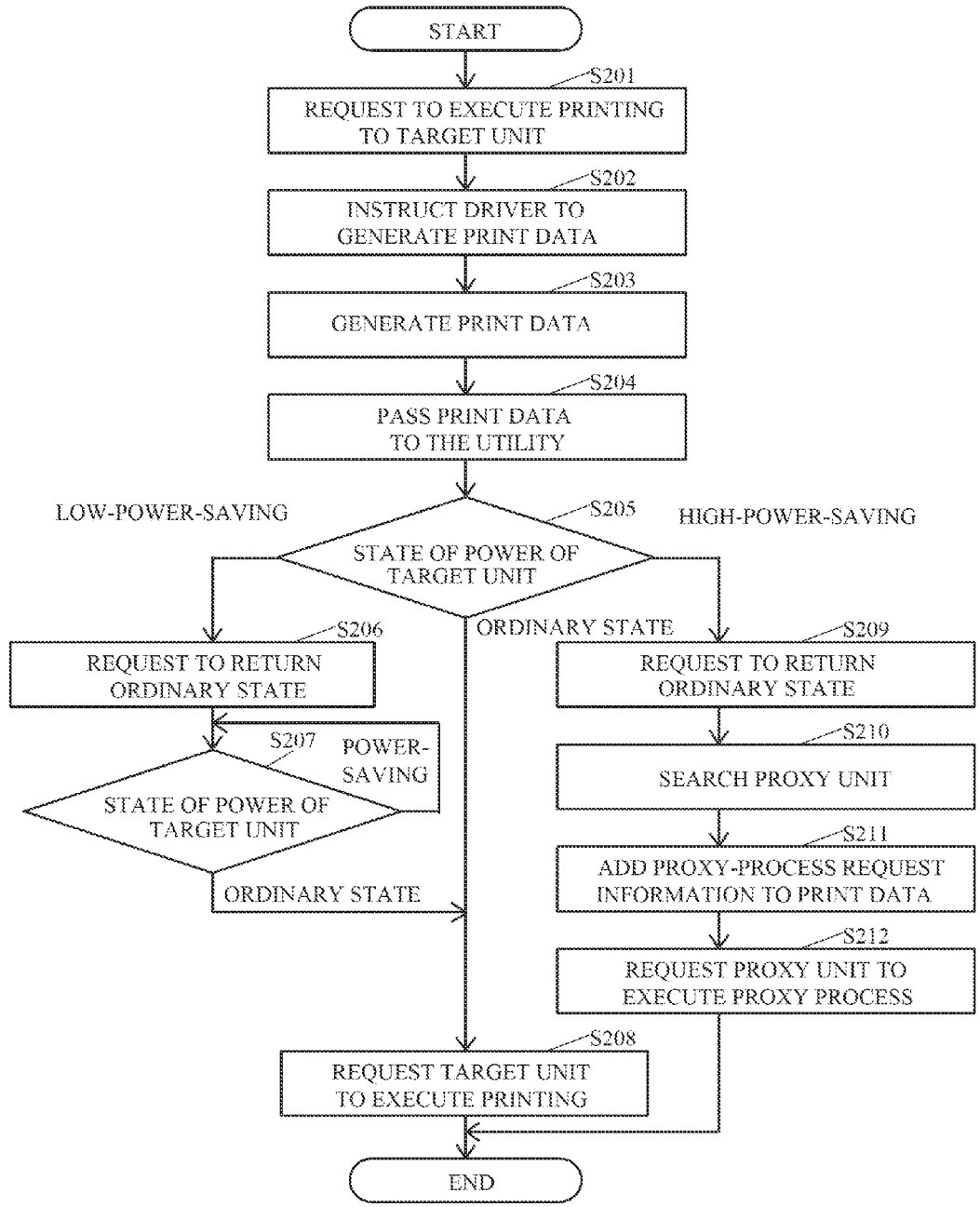
FIG. 4 shows a flowchart illustrating an operation of the PC when requesting the MFP to execute printing.

FIG. 4 shows a flowchart illustrating the operation of the PC when requesting the MFP to execute printing.

As shown in FIG. 4, the application 71 of the control unit 70 of the PC instructs the utility 73 to request to execute printing to an MFP designated by the user, that is, a target unit, in accordance with a user operation to the operating unit 51 (S201).

When the request to execute printing is given to the target unit from the application 71 in S201, the utility 73 instructs the driver 72 to generate print data, which is requested by the application 71 (S202).

When the instruction to generate print data is given by the utility 73 in S202, the driver 72 generates print data in response to the instruction from the utility 73 (S203).

Then, the driver 72 passes the generated print data to the utility 73 (S204).

When the print data is given in S204, the utility 73 checks the state of power of the target unit, given from the application 71 in S201, by using a simple network management protocol ("SNMP") (S205).

If it is determined in S205 that the power of the target unit is in the low-power-saving state, the return request unit 73c of the utility 73 requests the target unit to return to the ordinary state (S206).

Next, the utility 73 checks the power state of the target unit by using the SNMP until it is determined that the power of the target unit is in the ordinary state (S207).

If it is determined in S205 or S207 that the power of the target unit is in the ordinary state, the utility 73 requests the target unit to execute printing by transmitting the print data generated in S203 (S208), and the process shown in FIG. 4 ends.

If it is determined in S205 that the power state of the target unit is in the high-power-saving state, the return request unit 73c of the utility 73 requests the target unit to return to the ordinary state (S209).

Next, the proxy-unit search unit 73a of the utility 73 searches for a proxy unit by using the SNMP (S210).

The proxy-unit search unit 73a searches for a proxy unit on certain conditions. The conditions may include, for example, whether the proxy-unit search unit 73a is an MFP whose power is in the ordinary state, it is an MFP having a function capable of executing a proxy process that causes the same result as that of the target unit, and it is an MFP whose throughput for executing a proxy process is higher than or equal to a predetermined throughput.

Here, whether the proxy unit is an MFP having a function capable of executing a proxy process that causes the same result as that of the target unit is determined based on a number of conditions. Such conditions may include, for example, the following: whether it is an MFP having an emulation program capable of interpreting the print data generated in S203; whether it is an MFP equipped with a recording medium of a size designated as the size of a recording medium on which the print data generated in S203 is to be printed; whether it is an MFP having a printing function designated for the print data generated in S203, such as aggregate printing and two-sided printing; and so on.

Whether the throughput for executing the proxy process is higher than or equal to a predetermined throughput is determined based on, for example, the capacity of a memory in the MFP and the evaluated value of the performance of the CPU of the MFP.

The proxy-unit search unit 73a may acquire type names from the MFPs and acquire, among information necessary for searching for a proxy unit, information that has not changed from the default states of the individual types of MFP from a database stored in the PC in advance based on the type names. On the other hand, it is preferable that the proxy-unit search unit 73a directly acquire information that could be changed from the default state due to addition of a memory, such as the capacity of a memory of a MFP. Of course, the proxy-unit search unit 73a may directly acquire all information necessary for searching for a proxy unit from the MFPs.

After the process in S210, the proxy-process request unit 73b of the utility 73 adds proxy-process request information, which is information for requesting a proxy process, to the print data generated in S203 (S211).

Next, the proxy-process request unit 73b requests the proxy unit, which is found by the proxy-unit search unit 73a in S210, to execute the proxy process by transmitting the print data to which the proxy-process request information is added in S211 to the proxy unit (S212), and the process shown in FIG. 4 ends.

The operation of the MFP will now be described.

Figure 5:
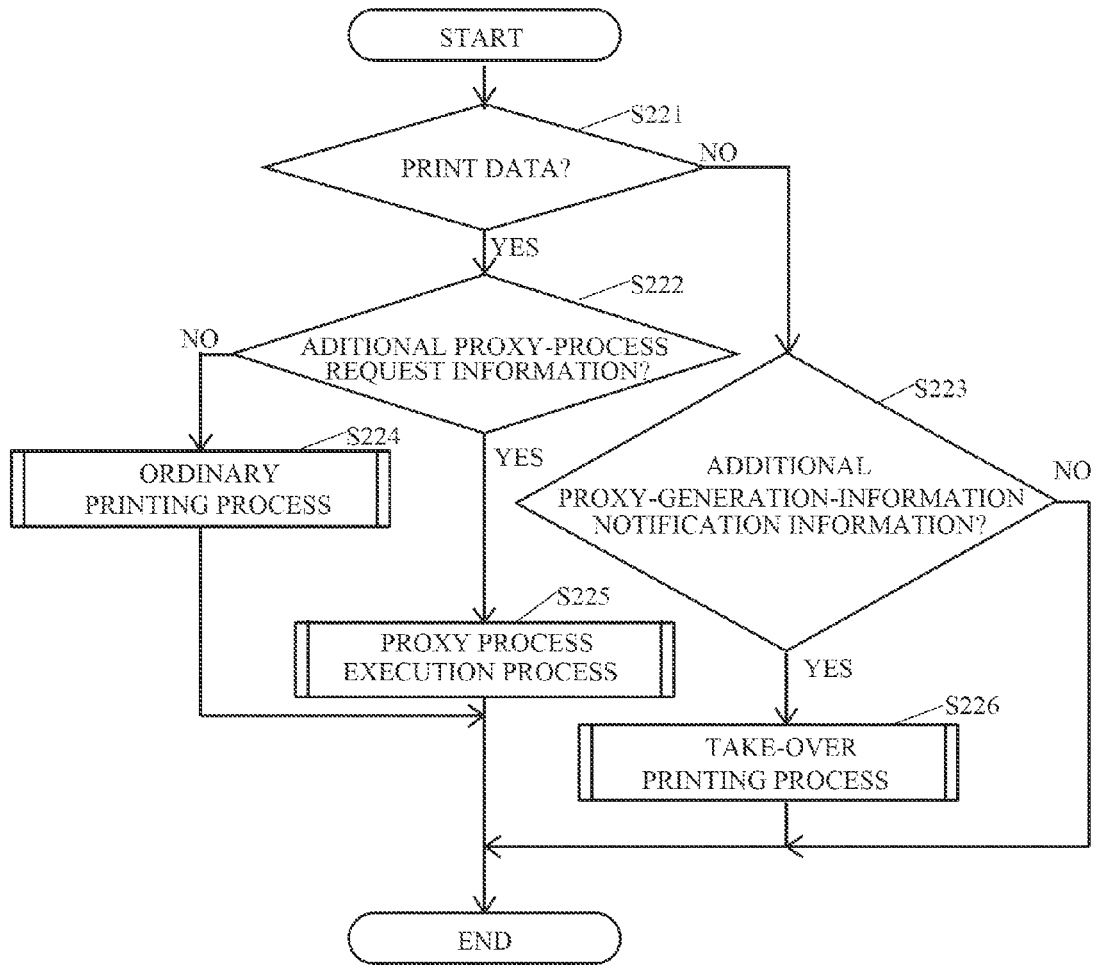
FIG. 5 shows a flowchart illustrating an the operation of the MFP.

FIG. 5 shows a flowchart illustrating the operation of the MFP.

When information is sent from the outside, the control unit 40 of the MFP executes the process shown in FIG. 5.

As shown in FIG. 5, the data interpretation unit 41 of the control unit 40 determines whether the information transmitted from the outside is print data (S221).

If it is determined in S221 that the information transmitted from the outside is print data, the data interpretation unit 41 determines whether the print data includes additional proxy-process request information (S222).

If it is determined in S221 that the information transmitted from the outside is not print data, the data interpretation unit 41 determines whether the information transmitted from the outside includes additional proxy-generation-information notification information for giving notification that it is proxy generation information (S223).

If it is determined in S222 that the print data includes no additional proxy-process request information, the data interpretation unit 41 executes an ordinary printing process, described later, (S224), and the process shown in FIG. 5 ends.

In contrast, if it is determined in S222 that the print data includes additional proxy-process request information, the data interpretation unit 41 executes a proxy process execution process, described later, (S225), and the process shown in FIG. 5 ends.

If it is determined in S223 that the information transmitted from the outside includes additional proxy-generation-information notification information, the data interpretation unit 41 executes a take-over printing process, described later, (S226), and the process shown in FIG. 5 ends.

In contrast, if it is determined in S223 that the information transmitted from the outside includes no additional proxy-generation-information notification information, the data interpretation unit 41 executes no process, and the process shown in FIG. 5 ends.

Figure 6:
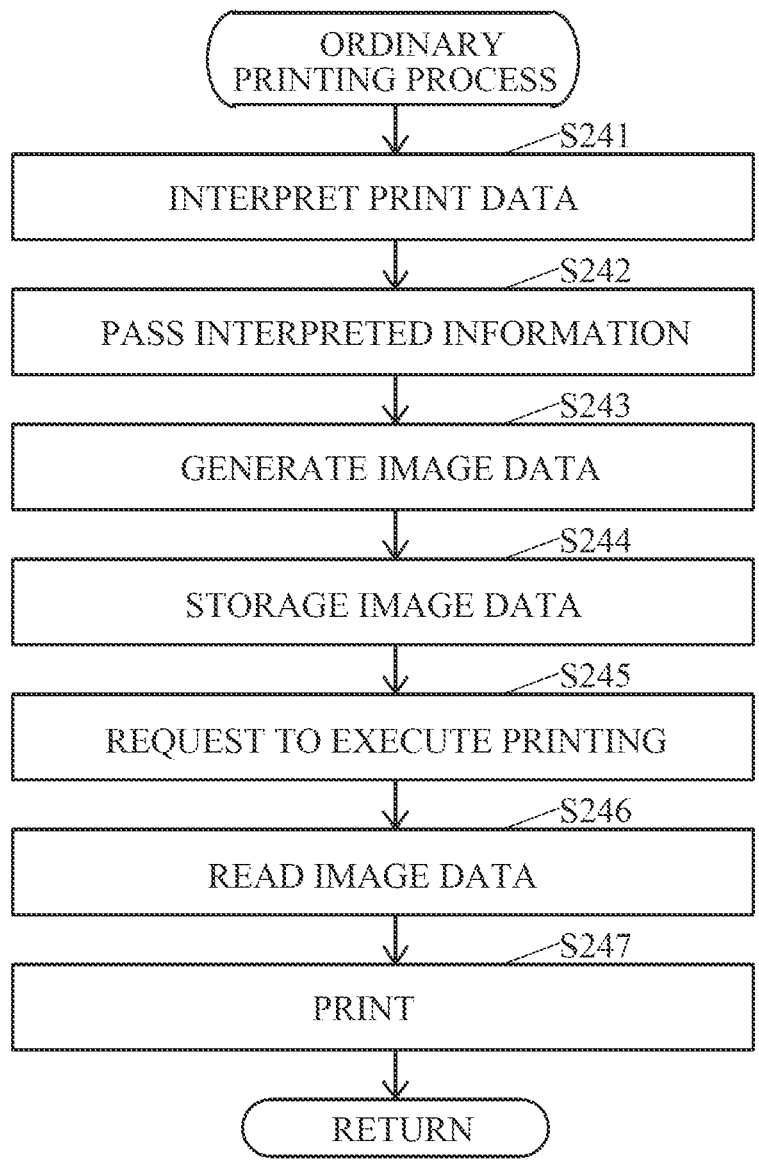
FIG. 6 shows a flowchart illustrating an ordinary printing process of the operations of the MFP.

FIG. 6 shows a flowchart illustrating the ordinary printing process shown in FIG. 5.

As shown in FIG. 6, the data interpretation unit 41 interprets the print data transmitted from the outside (S241).

Next, the data interpretation unit 41 passes the information interpreted in S241 to the image output unit 42 (S242).

When receiving the information passed from the data interpretation unit 41 in S242, the image output unit 42 generates the image data 31 immediately before being printed by performing rasterization thereon based on the information passed from the data interpretation unit 41 (S243).

Next, the image output unit 42 writes the generated image data 31 into the storage unit 30 (S244).

Then, the image output unit 42 requests the print-engine management unit 43 to execute printing (S245).

When the print-engine management unit 43 is requested by the image output unit 42 to execute printing in S245, the print-engine management unit 43 reads the image data 31 written in the storage unit 30 in S244 from the storage unit 30 (S246).

Then, the print-engine management unit 43 prints an image corresponding to the image data 31 read from the storage unit 30 on a recording medium with the printer 23 (S247), and the process shown in FIG. 6 ends.

Figure 7:
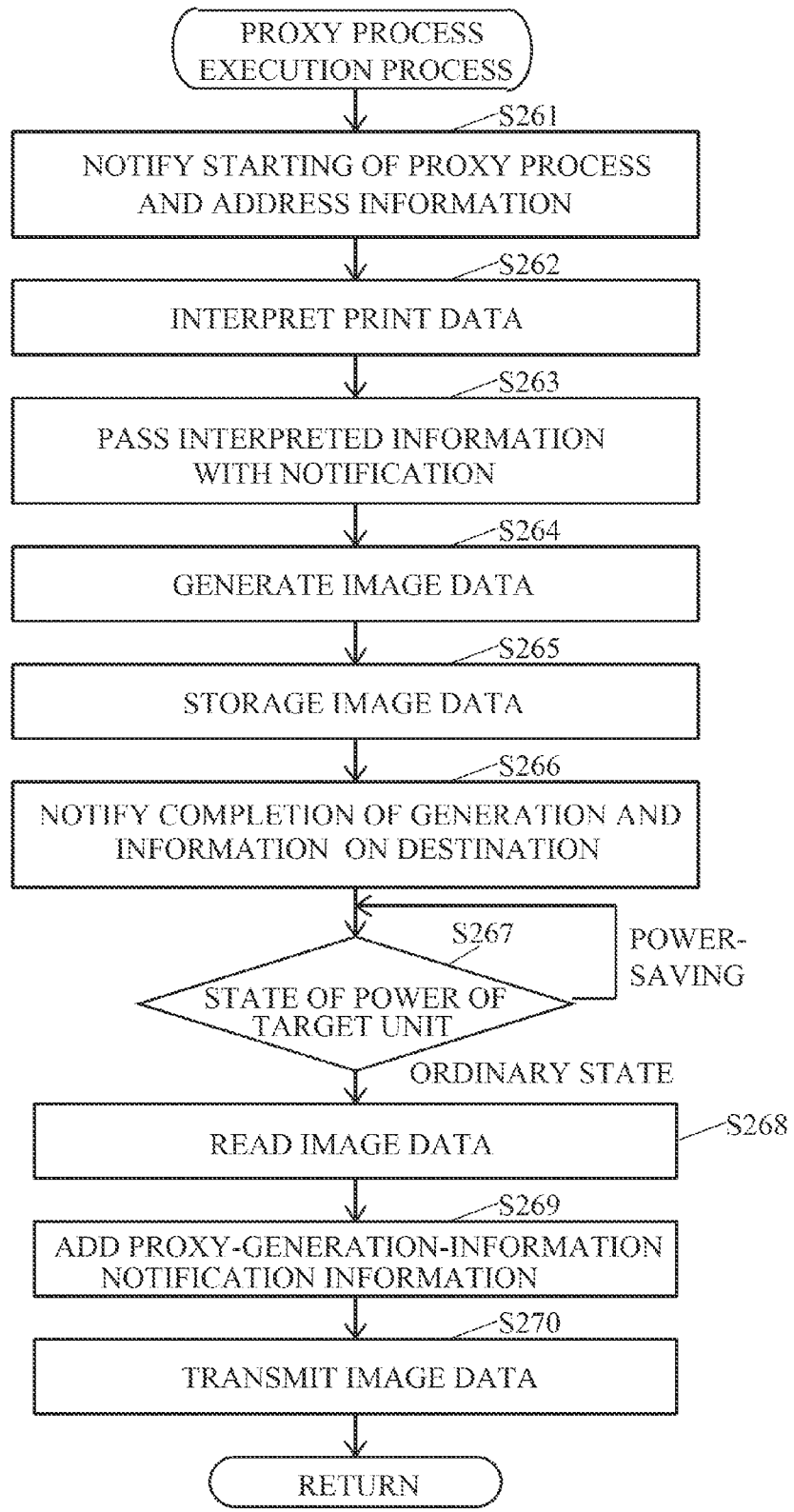
FIG. 7 shows a flowchart illustrating a proxy-process execution process of the operations of the MFP.

FIG. 7 shows a flowchart illustrating the proxy-process execution process shown in FIG. 5.

As shown in FIG. 7, the data interpretation unit 41 notifies the proxy-process management unit 44 of starting the proxy process and the address information of the target unit, which is the target MFP of the print data transmitted from the outside (S261).

Next, the data interpretation unit 41 interprets the print data transmitted from the outside (S262).

Then, the data interpretation unit 41 passes the information interpreted in S262 to the image output unit 42 together with the notification that the process is a proxy process (S263).

When receiving the information passed from the data interpretation unit 41 in S263, the image output unit 42 performs rasterization thereon based on the information passed from the data interpretation unit 41 to generate the image data 31 immediately before being printed (S264).

Next, the image output unit 42 writes the generated image data 31 into the storage unit 30 (S265).

The process from S262 to S265 is the same as that from S241 to S244 and constitutes the proxy process of the present disclosure. The image data 31 generated in S264 is information generated by the proxy process and constitutes the proxy generation information of the present disclosure.

After the process in S265, the image output unit 42 notifies the proxy-process management unit 44 of completion of the generation of the image data 31 and information on the destination of the generated image data 31 in the storage unit 30 (S266).

When receiving the notification that the generation of the image data 31 has ended in S266, the proxy-process management unit 44 checks the power state of the target unit by using the SNMP until it is determined that the power of the target unit whose address information is given in S261 is in the ordinary state (S267).

When it is determined in S267 that the power of the target unit is in the ordinary state, the proxy-generation-information transmission unit 44a of the proxy-process management unit 44 reads the image data 31 written in the storage unit 30 in S265 based on the destination information given in S266 (S268).

Next, the proxy-generation-information transmission unit 44a adds proxy-generation-information notification information to the image data 31 read in S268 (S269).

Then, the proxy-generation-information transmission unit 44a transmits the image data 31 to which the proxy-generation-information notification information is added in S269 to the target unit whose address information is given in S261 (S270), and the process shown in FIG. 7 ends.

Figure 8:
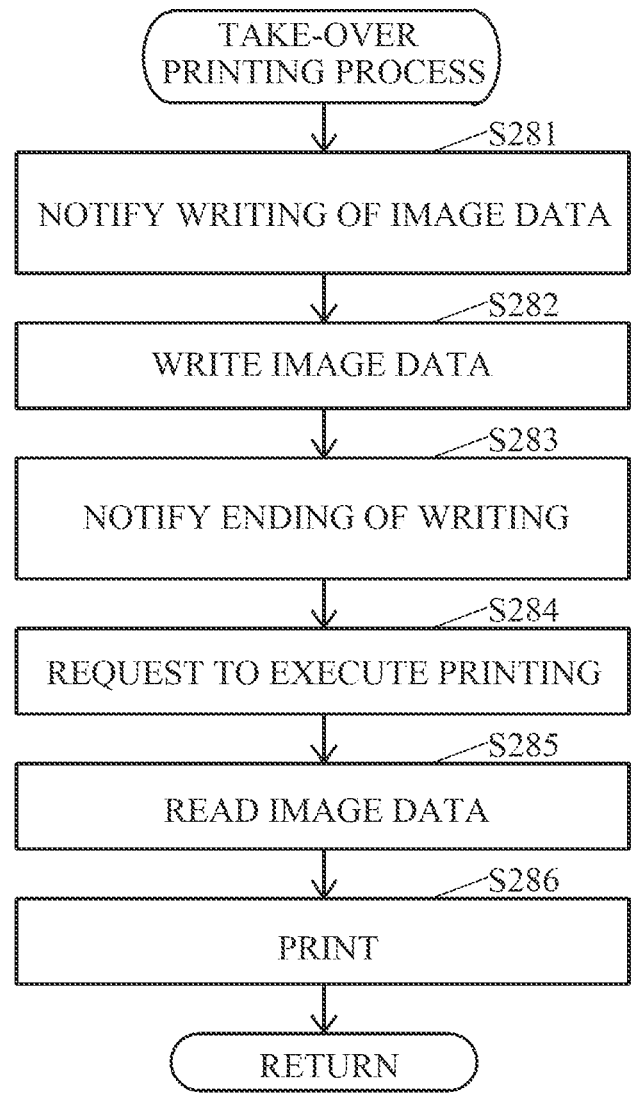
FIG. 8 shows a flowchart illustrating a take-over printing process of the operations of the MFP.

FIG. 8 shows a flowchart illustrating the take-over printing process shown in FIG. 5.

As shown in FIG. 8, the data interpretation unit 41 notifies the proxy-process management unit 44 that writing of the image data 31, which is proxy generation information, is to be started (S281).

Next, the data interpretation unit 41 writes the image data 31 transmitted from the outside into the storage unit 30 (S282).

Then, the data interpretation unit 41 notifies the proxy-process management unit 44 that writing of the image data 31 has ended (S283).

When receiving the notification that writing of the image data 31 has ended in S283, the printing-process take-over unit 44b of the proxy-process management unit 44 requests the print-engine management unit 43 to execute printing (S284). In other words, the printing-process take-over unit 44b takes over printing from halfway and executes the printing based on the image data 31, which is proxy generation information transmitted from the outside.

When receiving the request to execute printing from the printing-process take-over unit 44b in S284, the print-engine management unit 43 reads the image data 31 written in the storage unit 30 in S282 (S285).

Next, the print-engine management unit 43 prints an image corresponding to the image data 31 read from the storage unit 30 on a recording medium with the printer 23 (S286), and the process shown in FIG. 8 ends.

The overall operation of the network system 10 will be described based on the operations of the PC and the MFP described above.

First, the overall operation of the network system 10 will be described in the case where the power of a target unit (hereinafter referred to as MFP 20A) is in the ordinary state when the PC 50 attempts to transmit print data to the MFP 20A.

Figure 9:
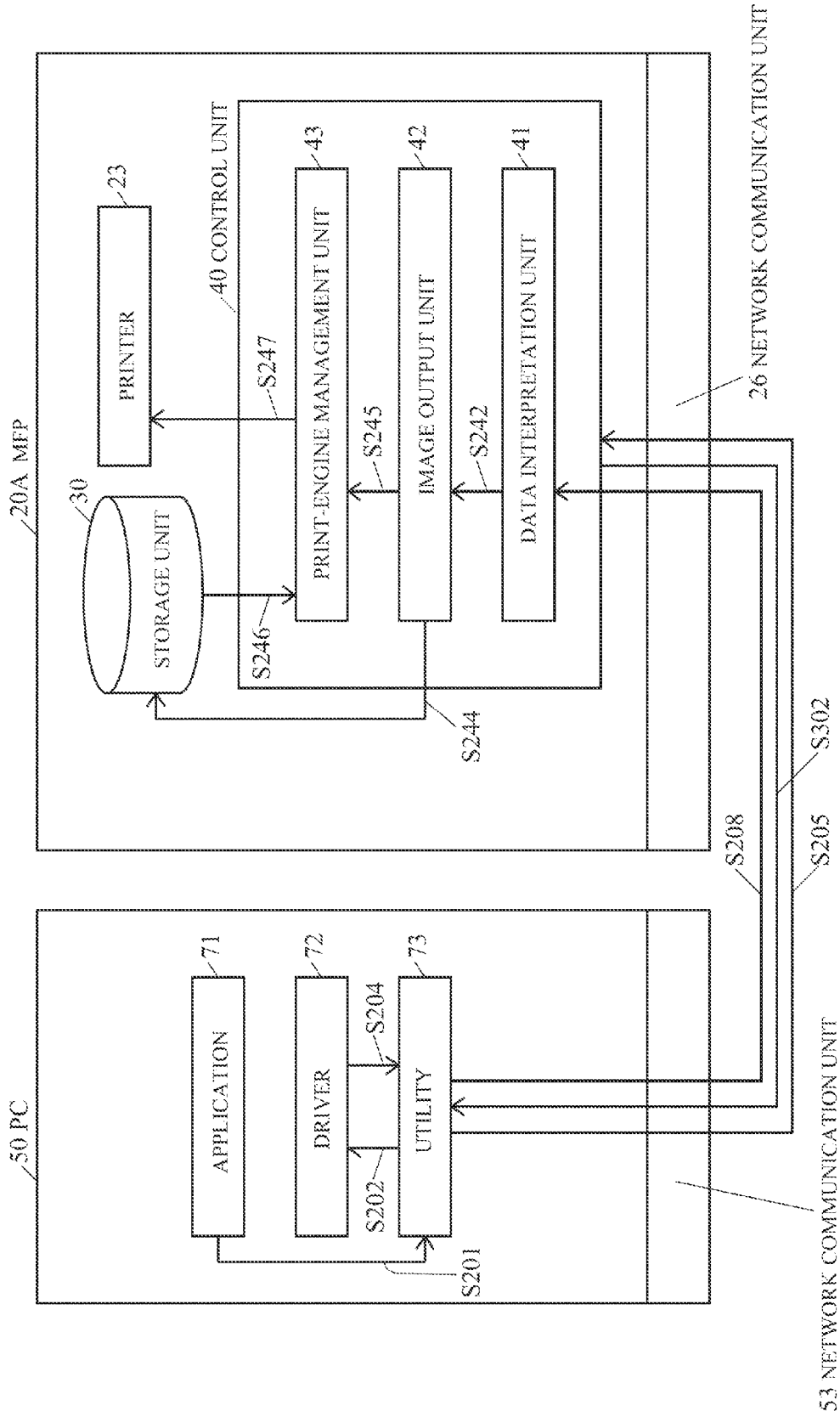
FIG. 9 shows a schematic diagram illustrating a flow of information in the case where the power of the MFP is in the ordinary state when the PC attempts to transmit print data to the MFP.
Figure 10:
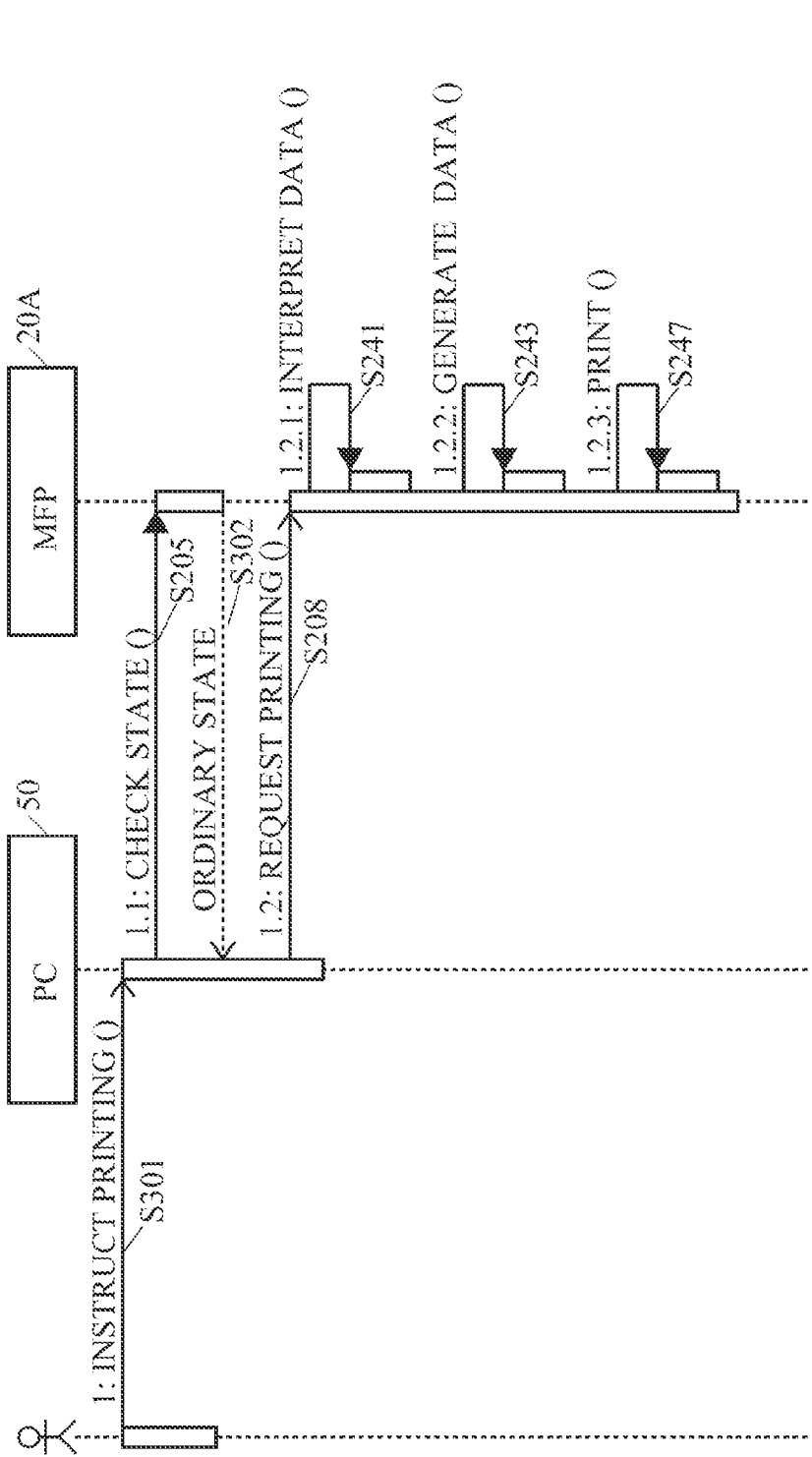
FIG. 10 shows a sequence diagram of the network system in the case where the power of the MFP is in the ordinary state when the PC attempts to transmit print data to the MFP.

FIG. 9 shows a schematic diagram illustrating a flow of information in the case where the power of the MFP 20A is in the ordinary state when the PC 50 attempts to transmit print data to the MFP 20A. FIG. 10 shows a sequence diagram illustrating a configuration of the network system 10 in the case where the power of the MFP 20A is in the ordinary state when the PC 50 attempts to transmit print data to the MFP 20A.

As shown in FIGS. 9 and 10, when the user instructs the PC 50 to perform printing in the MFP 20A via the operating unit 51 (S301), the PC 50 executes the process from S201 to S204 (see FIG. 4) and thereafter checks the power state of the MFP 20A (S205).

Then, the control unit 40 of the MFP 20A replies to the PC 50 that the power is in the ordinary state (S302).

When receiving the reply that the power is in the ordinary state in S302, the PC 50 requests the MFP 20A to execute printing (S208).

When receiving the request to execute printing in S208, the MFP 20A determines in S221 that the information transmitted from the outside is print data (see FIG. 5), determines in S222 that the print data includes no additional proxy-process request information (see FIG. 5), and executes the ordinary printing process in S224 (see FIG. 5).

In other words, the MFP 20A executes printing on a recording medium with the printer 23 by executing the process from S241 to S247 (see FIG. 6).

Next, the overall operation of the network system 10 will be described in the case where the power of the MFP 20A is in the low-power-saving state when the PC 50 attempts to transmit print data to the MFP 20A.

Figure 11:
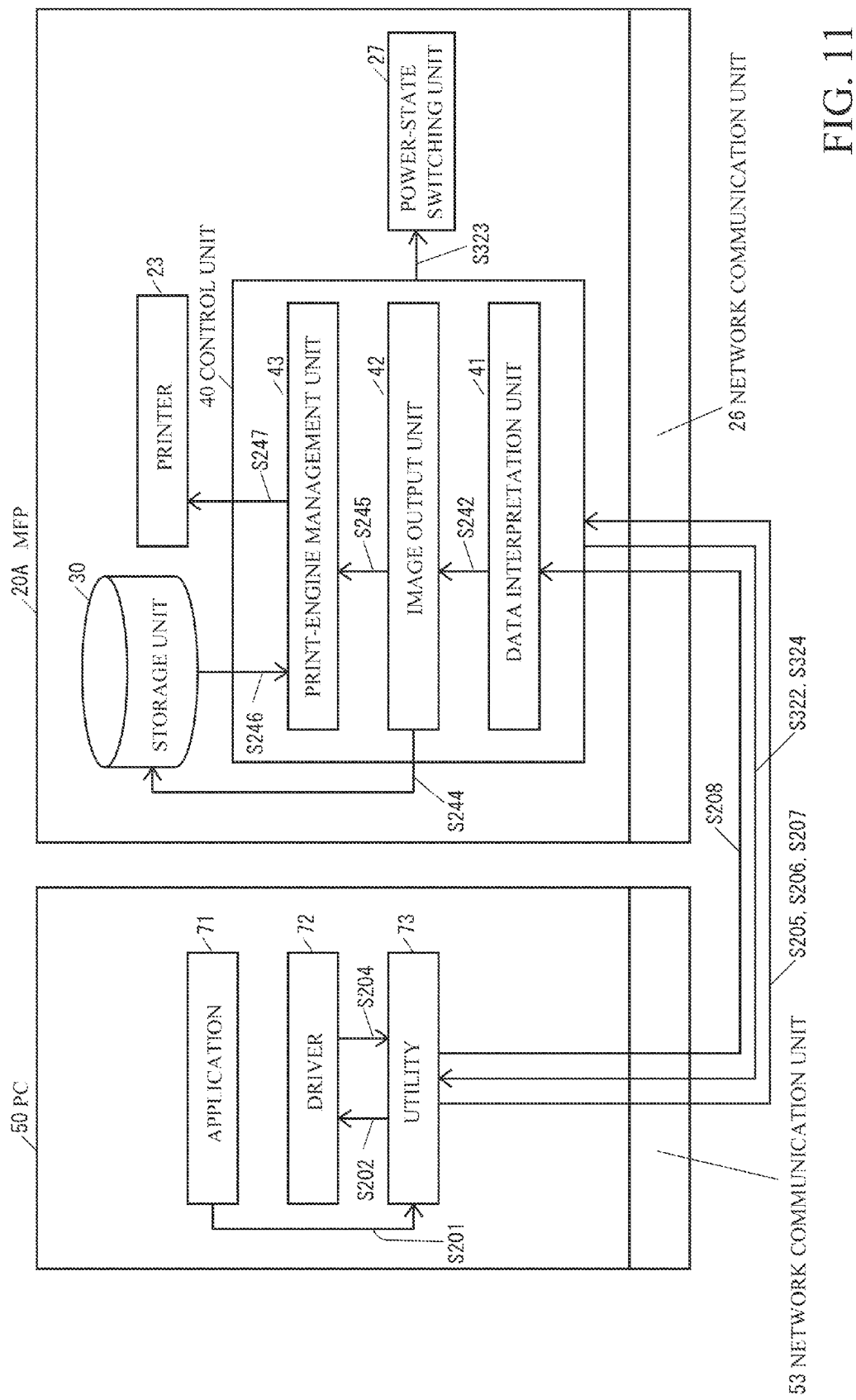
FIG. 11 shows a diagram illustrating a flow of information in the case where the power of the MFP is in a low-power-saving state when the PC attempts to transmit print data to the MFP.
Figure 12:
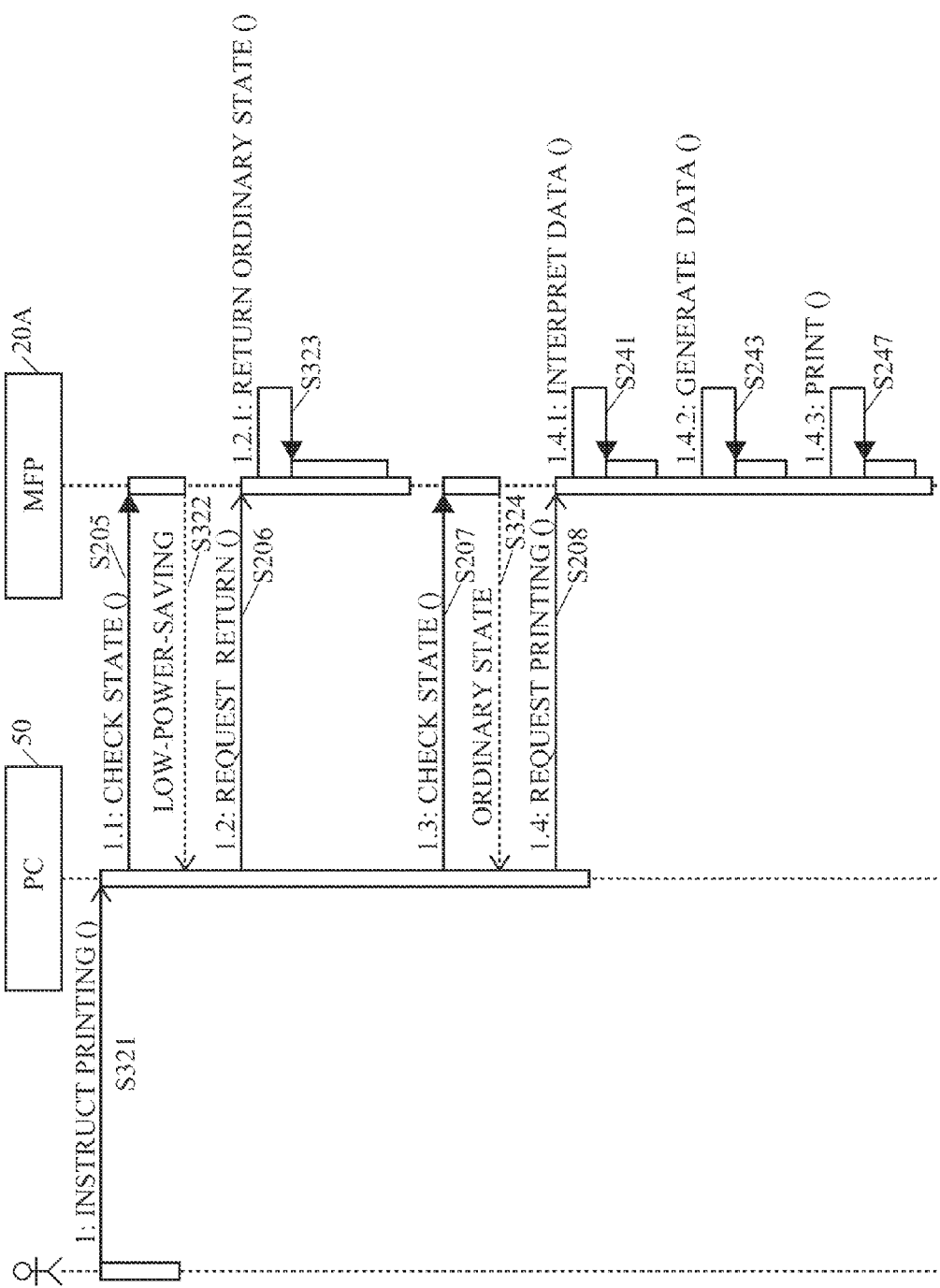
FIG. 12 shows a sequence diagram of the network system in the case where the power of the MFP is in the low-power-saving state when the PC attempts to transmit print data to the MFP.

FIG. 11 shows a schematic diagram illustrating a flow of information in the case where the power of the MFP 20A is in the low-power-saving state when the PC 50 attempts to transmit print data to the MFP 20A. FIG. 12 shows a sequence diagram illustrating a configuration of the network system 10 in the case where the power of the MFP 20A is in the low-power-saving state when the PC 50 attempts to transmit print data to the MFP 20A.

As shown in FIGS. 11 and 12, when the user instructs the PC 50 to perform printing in the MFP 20A via the operating unit 51 (S321), the PC 50 executes the process from S201 to S204 (see FIG. 4) and thereafter checks the power state of the MFP 20A (S205).

Then, the control unit 40 of the MFP 20A replies to the PC 50 that the power is in the low-power-saving state (S322).

When receiving the reply that the power is in the low-power-saving state in S322, the PC 50 requests the MFP 20A to return to the ordinary state (S206).

Then, the control unit 40 of the MFP 20A controls the power-state switching unit 27 so that the power state is returned from the low-power-saving state to the ordinary state (S323).

The PC 50 checks the power state of the MFP 20A after the process in S206 until it is determined that the power of the MFP 20A is in the ordinary state (S207).

When the power state returns to the ordinary state, the control unit 40 of the MFP 20A replies to the PC 50 that the power is in the ordinary state (S324).

When receiving the reply that the power is in the ordinary state in S324, the PC 50 requests the MFP 20A to execute printing (S208).

When receiving the request to execute printing in S208, the MFP 20A determines in S221 that the information transmitted from the outside is print data (see FIG. 5), determines in S222 that the print data includes no additional proxy-process request information (see FIG. 5), and executes the ordinary printing process in S224 (see FIG. 5).

In other words, the MFP 20A executes printing on a recording medium with the printer 23 by executing the process from S241 to S247 (see FIG. 6).

Next, the overall operation of the network system 10 will be described in the case where the power of the MFP 20A is in the high-power-saving state when the PC 50 attempts to transmit print data to the MFP 20A.

Figure 13:
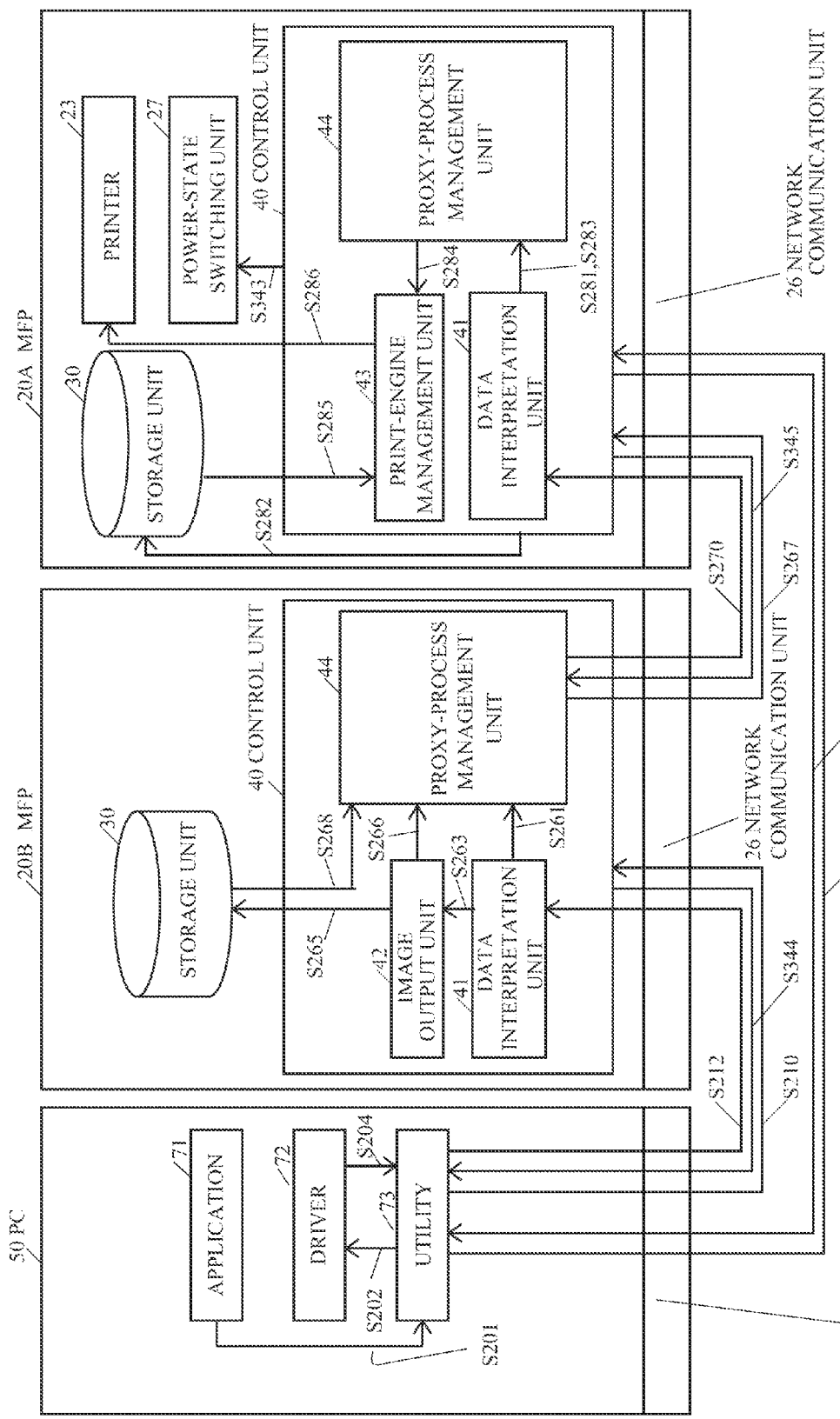
FIG. 13 shows a schematic diagram illustrating a flow of information in the case where the power of the MFP is in a high-power-saving state when the PC attempts to transmit print data to the MFP.
Figure 14:
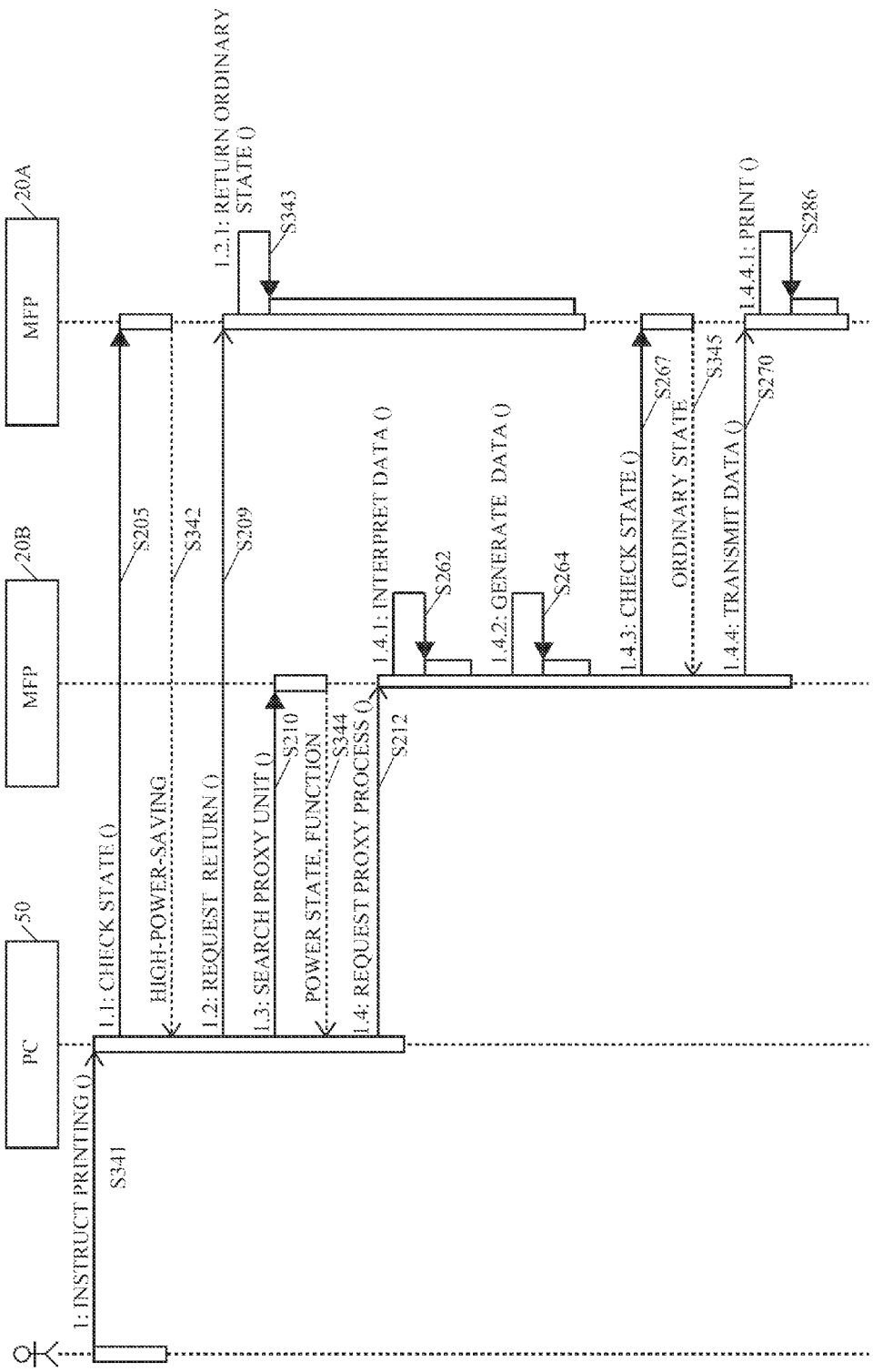
FIG. 14 shows a sequence diagram of the network system in the case where the power of the MFP is in the high-power-saving state when the PC attempts to transmit print data to the MFP.

FIG. 13 shows a schematic diagram illustrating a flow of information in the case where the power of the MFP 20A is in the high-power-saving state when the PC 50 attempts to transmit print data to the MFP 20A. FIG. 14 shows a sequence diagram illustrating a configuration of the network system 10 in the case where the power of the MFP 20A is in the high-power-saving state when the PC 50 attempts to transmit print data to the MFP 20A.

As shown in FIGS. 13 and 14, when the user instructs the PC 50 to perform printing in the MFP 20A via the operating unit 51 (S341), the PC 50 executes the process from S201 to S204 (see FIG. 4) and thereafter checks the power state of the MFP 20A (S205).

Then, the control unit 40 of the MFP 20A replies to the PC 50 that the power is in the high-power-saving state (S342).

When receiving the reply that the power is in the high-power-saving state in S342, the PC 50 requests the MFP 20A to return to the ordinary state (S209).

Then, the control unit 40 of the MFP 20A controls the power-state switching unit 27 so that the power state is returned from the high-power-saving state to the ordinary state (S343).

The PC 50 searches for a proxy unit after the process in S209 (S210).

Then, MFPs other than the MFP 20A reply to the PC 50 with information, such as the power state and information on the functions thereof (S344).

When receiving the reply in S344, the PC 50 executes the process in S211 and thereafter requests the found proxy unit (hereinafter referred to as MFP 20B) to execute a proxy process (S212).

When receiving the request to execute a proxy process in S212, the MFP 20B determines in S221 that the information transmitted from the outside is print data (see FIG. 5), determines in S222 that the print data includes additional proxy-process request information (see FIG. 5), and executes the proxy-process execution process in S225 (see FIG. 5).

In other words, the MFP 20B checks the power state of the MFP 20A after executing the process from S261 to S266 (see FIG. 7) until it is determined that the power of the MFP 20A is in the ordinary state (S267).

When the power state returns to the ordinary state, the control unit 40 of the MFP 20A replies to the MFP 20B that the power is in the ordinary state (S345).

When receiving the reply that the power is in the ordinary state in S345, the MFP 20B executes the process in S268 and S269 (see FIG. 7) and thereafter transmits the image data 31 to which proxy-generation-information notification information is added to the MFP 20A (S270).

When the image data 31 to which proxy-generation-information notification information is added is transmitted from the MFP 20B, the MFP 20A determines in S221 that the information transmitted from the outside is not print data (see FIG. 5), determines in S223 that the information transmitted from the outside includes additional proxy-generation-information notification information (see FIG. 5), and executes the take-over printing process in S226 (see FIG. 5).

In other words, the MFP 20A executes printing on a recording medium with the printer 23 by executing the process from S281 to S286 (see FIG. 8).

As described above, a proxy process that is a proxy process to halfway through a printing process to be executed by a target MFP is executed by another MFP serving as a proxy unit (S262 to S265). Further, the target MFP takes over the printing from halfway therethrough based on information generated by the proxy process (S284 to S286). This can reduce the first printing time after the power returns from the power-saving state to the ordinary state, as compared with that in the related art.

As described above, an MFP serving as a proxy unit executes a proxy process to halfway through a printing process to be executed by an external target unit (S262 to S265). In the case where the power of the target unit is in the ordinary state (the ordinary state in S267), the MFP transmits information generated by the proxy process to the target unit. This can reduce the first printing time of the target unit after the target unit returns from the power-saving state to the ordinary state, as compared with that in the related art.

As described above, the PC that executes the utility software 63 causes a proxy unit to execute a proxy process which is a proxy process to halfway through a printing process to be executed by the target unit (S212). This can reduce the first printing time of the target unit after the target unit returns from the power-saving state to the ordinary state, as compared with that in the related art.

As described above, when the power of the target unit is in the high-power-saving state, the network system 10 executes a proxy process that is a proxy process to halfway through a printing process. The proxy process is to be executed by the target unit with a proxy unit in parallel with the returning process of the target unit during the time the target unit returns from the high-power-saving state to the ordinary state (S262 to S265). When the power of the target unit is in the ordinary state (the ordinary state in S267), information generated by the proxy process is transmitted to the target unit by the proxy unit (S270), and the target unit takes over the printing from halfway based on the information generated by the proxy process (S284 to S286). This can reduce the first printing time of the target unit after the target unit returns from the high-power-saving state to the ordinary state, as compared that in the related art.

Also when the power of the target unit is in the high-power-saving state, the network system 10 can cause the target unit to execute final printing on the recording medium, not causing an MFP other than the target unit to execute printing on a recording medium. In other words, the network system 10 can always generate printing in a target unit designated by the user. Accordingly, the network system 10 offers higher convenience to the user than that of a configuration in which an MFP other than the target unit executes printing on a recording medium by proxy.

Since the PC searches for an MFP whose power is in the ordinary state as a proxy unit (S210), the PC can cause the MFP in the ordinary state to execute a proxy process. Accordingly, the PC can accelerate proxy-process end time as compared with a configuration in which an MFP in the power-saving state is returned from the power-saving state to the ordinary state and thereafter the MFP executes a proxy process.

Since the PC searches for an MFP having a function capable of executing a proxy process that causes the same result as with the target unit being a proxy unit (S210), the same print result can be achieved both where the proxy unit executes a proxy process and thereafter the target unit takes over the printing process, and where the target unit singly executes the entire printing process.

Since the PC searches for an MFP having a throughput for executing a proxy process higher than a predetermined throughput as a proxy unit (S210), the first printing time of the target unit after the target unit has returned from the power-saving state to the ordinary state can be prevented from extending due to the proxy process of the proxy unit. The PC need not have a throughput for executing a proxy process higher than a predetermined throughput as a condition for searching for a proxy unit.

Instead of or in addition to the foregoing conditions, the PC may adopt another condition as a condition for searching for a proxy unit. For example, the PC may set an MFP itself directly designated by the user as a proxy unit.

In this embodiment, the network system 10 is configured such that the PC requests the target unit to return to the ordinary state when the power of the target unit is in the high-power-saving state (the high-power-saving state in S205) (S209). However, the network system 10 may be configured such that the proxy unit requests the target unit to return to the ordinary state when the power of the target unit is in the high-power-saving state. In the case where the network system 10 is configured such that the PC requests the target unit to return to the ordinary state when the target unit is in a predetermined power-saving state, the target unit can be returned to the ordinary state earlier than the case where the proxy unit is caused to request the target unit to return to the ordinary state.

The proxy process of the MFP need not include generation of image data immediately before being printed. For example, an MFP serving as a proxy unit may always monitor the power state of the target unit. When the power of the target unit reaches the ordinary state, the image output process of the image output unit 42 may be stopped halfway, and the progress of the image output process and the generated data may be transmitted to the target unit. In this case, the MFP serving as the target unit takes over the image output process that the proxy unit has terminated from halfway.

In the foregoing embodiment, the PC determines whether to search for a proxy unit (S210) depending on the kind of the power-saving state of the target unit among the plurality of kinds of power-saving states (the low-power-saving state or the high-power-saving state in S205). However, the PC may be configured to cause a proxy unit to execute a proxy process when the power of the target unit is in the low-power-saving state and when the power of the target unit is in the high-power-saving state.

Although the image forming apparatus of the present disclosure is an MFP in this embodiment, it may be an image forming apparatus other than the MFP, such as a printer-specific machine.

Although the information processing unit of the present disclosure is a PC in this embodiment, it may be an information processing unit other than the PC.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent apparatuses and methods within the scope of the disclosure, in addition to those enumerated herein, will be apparent to those skilled in the art from the foregoing descriptions. Such modifications and variations are intended to fall within the scope of the appended claims. With respect to any or all of the ladder diagrams and flow charts in the drawings and as discussed herein, each block and/or communication may represent a process of information and/or a transmission of information in accordance with example embodiments and alternative embodiments may be included within the scope of such example embodiments. Further, more or fewer blocks and/or functions may be used with any of the ladder diagrams and flow charts discussed herein, and these ladder diagrams and flow charts may be combined with one another, in part or in whole.

The invention claimed is:

1. An image forming system comprising:
a plurality of image forming apparatuses and an information processing unit configured to request the plurality of image forming apparatuses to execute printing, wherein each of the plurality of the image forming apparatuses includes:
a power-state switching unit configured to switch among a plurality of power states including an ordinary state and a power-saving state in which power consumption is lower than that in the ordinary state;
the information processing unit includes:
a proxy-unit search unit configured to search for a proxy unit serving as the image forming apparatus that executes a proxy process, which is a proxy process to halfway through a printing process to be executed by a target unit, when the power of the target unit that is the target image forming apparatus requested to execute printing is in the power-saving state; and
a proxy-process request unit configured to request the proxy unit found by the proxy-unit search unit to execute the proxy process;
the proxy unit includes:
a proxy-process executing unit configured to execute the proxy process upon request; and
a proxy-generation-information transmission unit configured to, when the power of the target unit is in the ordinary state, transmit proxy generation information to the target unit, the proxy generation information being information generated by the proxy process executed by the proxy-process executing unit; and
the target unit includes:
a printing-process take-over unit configured to, when receiving the proxy generation information, take over the printing from halfway based on the proxy generation information,
wherein the plurality of power states includes a plurality of kinds of power-saving states, and
wherein the proxy-unit search unit is further configured to determine whether to search for the proxy unit based on the kind of power-saving state of the target unit among the plurality of kinds of power-saving states.

2. The image forming system according to claim 1, wherein the proxy-unit search unit is further configured to search for the image forming apparatus whose power is in the ordinary state as the proxy unit.

3. The image forming system according to claim 1, wherein the proxy-unit search unit is further configured to search, as the proxy unit, for the image forming apparatus having a function capable of executing the proxy process that causes the same result as that of the target unit.

4. The image forming system according to claim 1, wherein the proxy-unit search unit is further configured to search, as the proxy unit, for the image forming apparatus whose throughput for executing the proxy process is higher than or equal to a predetermined throughput.

5. The image forming system according to claim 1, wherein the information processing unit includes a return request unit configured to request the target unit to return to the ordinary state when the power of the target unit is in a predetermined power-saving state.

6. The image forming system according to claim 1, wherein the proxy process includes completion of generating of image data immediately before being printed.

7. A non-transitory computer-readable recording medium that stores a program for an information processing unit, the program being executed by an information processing unit that requests a plurality of image forming apparatuses to execute printing, the apparatuses capable of switching among a plurality of power states including an ordinary state and a power-saving state in which power consumption is lower than that in the ordinary state, wherein the program for the information processing unit causes the information processing unit to function as:
a proxy-unit search unit configured to search for a proxy unit serving as the image forming apparatus that executes a proxy process, which is a proxy process to halfway through a printing process to be executed by a target unit, when the power of the target unit that is the target image forming apparatus requested to execute printing is in the power-saving state; and
a proxy-process request unit configured to request the proxy unit found by the proxy-unit search unit to execute the proxy process, wherein the plurality of power states includes a plurality of kinds of power-saving states, and wherein the proxy-unit search unit is further configured to determine whether to search for the proxy unit based on the kind of power-saving state of the target unit among the plurality of kinds of power-saving states.

8. The non-transitory computer-readable recording medium according to claim 7, wherein the proxy-unit search unit is further configured to search for the image forming apparatus whose power is in the ordinary state as the proxy unit.

9. The non-transitory computer-readable recording medium according to claim 7, wherein the proxy-unit search unit is further configured to search, as the proxy unit, for the image forming apparatus having a function capable of executing the proxy process that causes the same result as that of the target unit.

10. The non-transitory computer-readable recording medium according to claim 7, wherein the proxy-unit search unit is further configured to search, as the proxy unit, for the image forming apparatus whose throughput for executing the proxy process is higher than or equal to a predetermined throughput.

11. The non-transitory computer-readable recording medium according to claim 7, wherein the program causes the information processing unit to implement a return request unit configured to request the target unit to return to the ordinary state when the power of the target unit is in a predetermined power-saving state.

12. The non-transitory computer-readable recording medium according to claim 7, wherein the proxy process includes completing generating image data immediately before printing.

* * * * *